Feb. 14, 1950 — C. G. BENNETT — 2,497,203

BUTTER PACKAGE

Filed Nov. 12, 1947

INVENTOR.
Clarence G. Bennett
BY
Robert D. Evanoff
ATTORNEY

Patented Feb. 14, 1950

2,497,203

UNITED STATES PATENT OFFICE 2,497,203

BUTTER PACKAGE

Clarence G. Bennett, San Mateo, Calif., assignor to Paterson Pacific Parchment Company, a corporation of California Application November 12, 1947, Serial No. 785,493

2 Claims. (Cl. 99—179)

This invention relates to laminated sheet materials and particularly to laminates including a relatively impermeable outer layer, a second outer layer of relatively permeable material, and an intermediate layer containing or consisting of an active ingredient whose effect is to be manifested through the permeable outer layer.

The broad object of the invention is to provide a novel type of laminated sheet combining in one the advantages of several different sheet materials together with a chemical or physical agent active through one of the outer layers.

Another object is to provide a new laminated sheet material having a community of physical and chemical characteristics not obtained in any such material now available.

Other and more specific objects will appear as the description proceeds.

The broad aspects of the invention will best be understood by consideration of the numerous embodiments or specific examples disclosed hereinafter.

In the drawings Figure 1 is a cross-section of a laminated material in accordance with the present invention.

Figure 1:
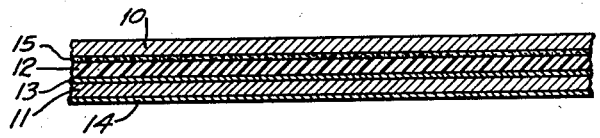

Figure 1 is a general representation of a laminated sheet structure having the general characteristics referred to in the following description of specific embodiments of this invention. That is the layer 10 is a permeable sheet material, for example, vegetable parchment paper. Layer 11 may be of cellophane and in the instance shown in Figure 1 may have the common coatings 13 and 14, as of waterproofing materials, or heat-sealing lacquer and the like. The center layer 12 may be an adhesive material or may be of porous or absorbent material containing an active material, which may also constitute a layer 15 on one side of the center layer. The active material may be either liquid or solid. This sheet, generically considered, may be utilized in many fields, as will appear.

In the creamery industry, for many years much effort has been put forth to eliminate the loss of weight of butter due to evaporation of water therefrom during cold storage in warehouses; also much effort has gone toward preventing the growth of mold upon the surface of the butter, which is commonly wrapped in vegetable parchment paper. One solution of this latter problem has been found in the treatment of the parchment paper wrappers or container liners with mold inhibiting chemicals, for example, sodium or calcium propionate. Sodium chloride is also used. This is commonly used by dipping the parchment paper just prior to use in a strong solution of the propionate and thereafter, while the paper is still moist, wrapping the butter, or lining the container and filling it with butter. For the purpose of reducing moisture loss in food products of many natures, impermeable materials such as waterproof regenerated cellulose have been utilized.

In the embodiment of my invention which I have successfully utilized in the solution of both the above mentioned problems, layer 11 of the laminate shown in Figure 1 is a heat sealing coated moisture-proofed cellophane. The layer 10 is a vegetable parchment paper and the layer 12 is a paraffine wax laminating or adhesive agent. Numeral 15 then indicates a layer or coating of sodium or calcium propionate. It is to be understood that the relative thicknesses of the layers are not true and that Figure 1 is exaggerated. The propionate layer 15 is not of such thickness as to prevent the parchment paper from being secured by the paraffine wax.

To utilize such a sheet material as a wrapper for butter, the butter will be wrapped with the material in such fashion that the layer 10 is in contact with the butter and the layer 11 is at the outside. Moisture contained in the butter will pass through the permeable parchment paper and dissolve the propionate and this solution then will diffuse back to the surface of the butter and prevent mold growth thereupon. The moisture will not, however, penetrate the wax layer and/or the cellophane layer, and reduction in weight occasioned by such moisture loss will be avoided.

One of several methods may be used in the preparation of the laminate shown in Figure 1. In one method the central layer 12 may be parchment paper which will be dipped into perhaps a 20% solution of sodium propionate and thereafter be dried and secured to the outer layers. In another method, a wax layer 12 may, while warm enough to be adherent, be dusted with sodium chloride, powdered sodium or calcium propionate and thereafter the parchment paper layer secured. Or, the layer 10 may be coated and thereafter secured to the cellophane layer 11.

The same type of sheet may be used as container liner, or as a portion or complete bag or container, as for butter, shortening, lard, ice cream, margarine, bread and pastry mixes, dessert powders, etc.

Another modification of the invention may be used in the art of preserving foods or other products which contain fats or oils and undergo oxidative deterioration or become rancid. An antioxygen or anti-rancidity agent obtained from oat flour and other cereal flours, and known on the market under several trade names, is widely used for this purpose. Suitable materials are disclosed in U. S. Patents 2,036,697, 2,029,248, 2,049,017 and 2,038,752. In a laminated wrapper or bag for purpose of preserving foods from rancidity or oxidation, the layer 10 might be of parchment paper as before, while the coating or other layer 15 may be of the antioxidative material. For materials not intended for human consumption, other agents, such as hydroquinone, furfural, etc., may be used. As applied to butter, 15 may include both anti-mold and anti-oxidant agents.

Figure 3:
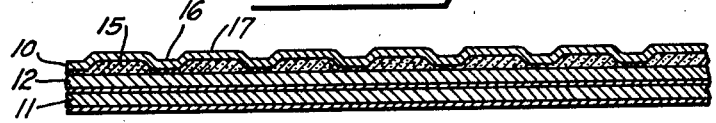
Figure 3 shows in section a modification of one of the outer layers of the laminate.
Figure 4:
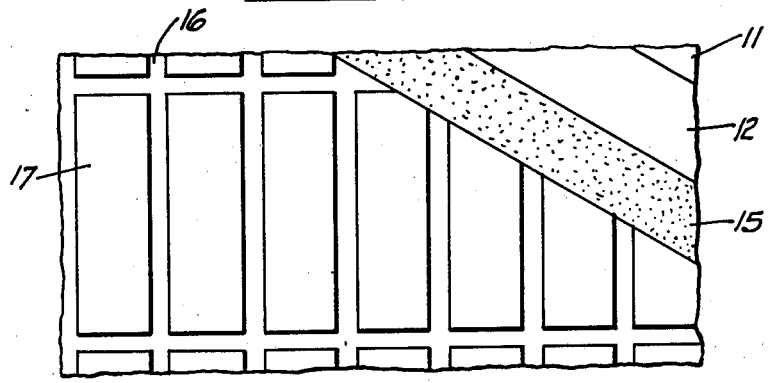
Figure 4 is a plan of the structure shown in Figure 3 with the layers of the laminate successively broken away in order more clearly to illustrate the invention.

In Figures 3 and 4 is shown a modified form of the laminated structure in which one of the layers has been structurally changed so as to accommodate a greater amount of active agent under the porous layer. In this instance, the layer 11 is cellophane, the laminating agent 12 is the wax and the outer layer 10 is of paper permeable to air. The upper layer 10, however, has been, as for example by means of relieved or intaglio press rolls, secured to the layer 12 only at spaced lines 16, leaving pockets 17 to accommodate a considerably increased portion of the material 15. Other patterns than the rectangular, as spot or line, may be used. A specific use for this particular laminate is in garment bags. Material 15 may be powdered naphthalene, paradichlorobenzene or other volatile insecticide or repellent. With the garment bag made up so that the layer 10 is on the inside, sublimation of the active agent 15 will be restricted to the inside of the bag where it may perform its function, and the material is not wasted by being diffused into the outer atmosphere.

Garment bags made of the laminate shown in Figures 3 and 4 are extremely effective for the purpose, protecting the garments enclosed within from moisture and other outside influences and inhibiting the activities or, depending upon the nature of the material 15, actually destroying moths or their larva. The layer of porous paper 15 prevents actual contact of the garments with the treating agent and controls the rate of evaporation or sublimation of the material. The sheet may be used as chest liners, and might incorporate cedar oil in the center layer, for its fragrance or supposed repellent effect.

The structure shown in Figures 3 and 4 is also particularly useful in case the material 15 is of a water absorbent or adsorbent nature, for example, silica jel, activated alumina, etc. Such a laminate is useful for the wrapping of machine parts, for example, which are subject to rust in case the moisture content of the air surrounding them reaches a certain rather low figure. The moisture-proof cellophane layer, being on the outside, prevents the penetration of moisture from the outside, while the moisture contained in the package as formed is quickly removed from the air by the desiccant 15.

Figure 2:
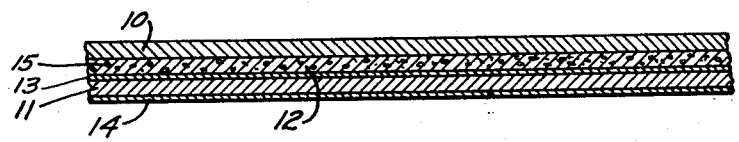
Figure 2 is a cross-section of a similar laminate involving different component parts.

Figure 2 shows a less desirable, but still useful, embodiment of the invention in which the active agent 15, instead of merely being coated upon either the wax layer 12 or the inner surface of the outer porous layer 10, is contained within the wax layer 12. This may be less desirable than the embodiment indicated in Figure 1 in some applications where the moisture-proof quality of the layer 12 is particularly desired, but may be of even more advantage than that shown in Figure 1 where the slow release of the material 15 from the wax is an advantage. The adhesive may, for example, be one in which the chemical popularly called dichlorodiphenyltrichloroethane may be dissolved or suspended, and the laminate used to line enclosed spaces for insecticidal purposes.

Many changes are possible. The layer 11, for example, may be of other impermeable materials, such as tinfoil, aluminum foil, wax paper, moisture-proof resin or plastic sheet material, or other materials having the desired qualities as to being impermeable to water, grease, air, etc. The laminating agent 12 may be of any of those used in this art and not incompatible with the material 15 which it is desired to use in any specific application. The layer 10 is usually of some porous, absorbent, permeable material such as paper, unwaterproofed cellophane and other permeable sheet materials. In case the material 15 is of a nature to diffuse into the air, the layer 10 should be air permeable. If it is desired that the material 15 be dissolved in water passing through the layer 10, then layer 10 should be sufficiently permeable to water to allow such action.

The central layer 12 may be porous paper or the like impregnated or coated with the active agent. For example, a laminate including a central layer impregnated with glycerol will be of value in retaining moisture in a substance wrapped therein. The central or an outer layer may be decorated, or one of the layers may be printed with indicia of quantity for filling or using, visible from the outside of the container.

The layers may be secured throughout their contacting surfaces, or at points, or in case of small sheets, only at edges.

One or more of the layers may be colored for such purpose as stopping light of certain wavelength, etc. The center layer may include powdered aluminum for its decorative or heat conducting effect, or asbestos fibers for insulation purposes. Any paper or especially treated paper is contemplated for use. One of the contemplated uses is in a bag or other container for the packaging of asphaltic materials including tar, asphalt cements, roofing asphalts, etc.

I claim:

1. A butter package comprising a cake of fresh butter completely enclosed in a sheet material comprising a relatively water and moisture impermeable base sheet material positioned on the outside of the package, a relatively water permeable sheet of vegetable parchment positioned in direct contact with the cake of butter, a layer of water soluble mold-retarding material selected from the group consisting of sodium chloride, sodium propionate, calcium propionate, and mixtures thereof, provided between said sheets, and a laminating agent securing said sheets together as a unitary wrapper with said mold-retarding material therebetween.

2. A butter package comprising a cake of fresh butter completely enclosed in a sheet material consisting of a relatively water and moisture impermeable base sheet material positioned on the outside of the package, a relatively water permeable sheet of vegetable parchment positioned in direct contact with the cake of butter, a layer of water soluble mold-retarding material selected from the group consisting of sodium chloride, sodium propionate, calcium propionate, and mixtures thereof, provided between said sheets, and a laminating agent securing said sheets together as a unitary wrapper with said mold-retarding material therebetween.

CLARENCE G. BENNETT.

REFERENCES CITED

The following references are of record in the file of this patent:

UNITED STATES PATENTS

| Number | Name | Date |
|---|---|---|
| 2,204,612 | Musher | June 18, 1940 |
| 2,240,072 | Hodgdon et al. | Apr. 29, 1941 |
| 2,329,908 | Johnson | Sept. 21, 1943 |
| 2,415,387 | Graebner et al. | Feb. 4, 1947 |
| 2,427,647 | Vahlteich | Sept. 16, 1947 |
| 2,441,477 | Farrell | May 11, 1948 |

FOREIGN PATENTS

| Number | Country | Date |
|---|---|---|
| 490,349 | Great Britain | Aug. 12, 1938 |